United States Patent [19]

Sandstrom

[11] Patent Number: 5,046,361
[45] Date of Patent: Sep. 10, 1991

[54] METHOD AND APPARATUS FOR BALANCING ROTATABLE MEMBERS

[76] Inventor: Kenneth A. Sandstrom, 9668 Fieldstone Dr., Minocqua, Wis. 54548

[21] Appl. No.: 666,473

[22] Filed: Mar. 6, 1991

Related U.S. Application Data

[63] Continuation of Ser. No. 427,293, Oct. 26, 1989, abandoned.

[51] Int. Cl.[5] .............................................. G01M 1/22
[52] U.S. Cl. ...................................... 73/460; 73/462; 73/473
[58] Field of Search ................ 73/460, 462, 468, 473, 73/475, 476, 477

[56] References Cited

U.S. PATENT DOCUMENTS

| | | | |
|---|---|---|---|
| 1,598,543 | 8/1926 | Spicer | 73/477 |
| 2,412,473 | 12/1946 | Schnoebelen | 73/473 |
| 3,192,775 | 7/1965 | Federn et al. | 73/460 |
| 4,046,017 | 9/1977 | Hill | 73/462 |
| 4,193,305 | 3/1980 | Hunter | 73/473 |
| 4,724,708 | 2/1988 | Okano et al. | 73/460 |
| 4,741,210 | 5/1988 | Maus | 73/462 |

FOREIGN PATENT DOCUMENTS

| | | | |
|---|---|---|---|
| 593813 | 2/1934 | Fed. Rep. of Germany | 73/51 |
| 631048 | 6/1936 | Fed. Rep. of Germany | 73/475 |
| 266759 | 6/1927 | United Kingdom | 73/51 |
| 460469 | 1/1937 | United Kingdom | 73/51 |

Primary Examiner—Hezron E. Williams
Assistant Examiner—Craig Miller
Attorney, Agent, or Firm—Learman & McCulloch

[57] ABSTRACT

A method and apparatus for balancing rotatable members whereby a member to be balanced is rotated first in one direction about an axis at a selected speed and then is rotated in the opposite direction about the same axis and at the same speed. A sensor determines the circumferential apparent location of greatest imbalance or runout of the member in each of the directions of rotation, following which any imbalance of the rotatable member is compensated for by adding or removing weight to or from such member at a circumferential zone which is equidistant between the apparent locations of greatest imbalance.

12 Claims, 5 Drawing Sheets

METHOD AND APPARATUS FOR BALANCING ROTATABLE MEMBERS

This is a continuation of copending application(s) Ser. No. 07/427,293 filed on Oct. 26, 1989 now abandoned.

This invention relates to a method and apparatus for dynamically balancing a rotatable member or workpiece, such as a vehicle driveshaft or the like. Imbalance is determined by rotating the member in opposite directions about the same axis and at the same speed to locate two circumferentially spaced zones of apparent maximum imbalance, thereby enabling the member to be balanced by adding or subtracting a suitable amount of weight at a point midway between the two zones.

BACKGROUND OF THE INVENTION

Many efforts have been made to improve the accuracy of balancing different kinds of rotatable members. To date, such efforts still depend on either trial and error or attempted standardization techniques. For example, mechanical balancing has involved the rotation of the member to be balanced, mechanical gauging of the runout of such member during totation, and the addition or removal of weight in trial and error increments resulting in repeated rotational testing until the correct amount of weight has either been added or removed and the member is acceptably rotationally stable.

Accuracy has been improved to some extent by the introduction of electronic components capable of reacting to runout more quickly. Such electronic components have been combined with the basically required mechanical aspects of a balancer, but all such known improvements nevertheless depend primarily on trial and error techniques.

In the manufacture of certain rotatable members, such as armatures, flywheels, turbines, driveshafts, and crankshafts, a certain basic or standard imbalance can be present. This can be relied upon to some extent to minimize the time required to effect ultimate balancing of such a rotatable member. The technique used, for example, involves the mechanical rotation of the member and the determination of a location of imbalance of the nature previously referred to, with or without the assistance of electronic components. Because of experience gained from sufficient repetition, the amount of weight to be added or removed can be charted, in certain situations, and the length of time involved in the trial and error balancing of the member somewhat reduced.

Existing equipment used in balancing rotatable members and involving the combination of mechanical and electronic components utilizes known types of velocity transducers which detect the lateral motion due to imbalance of a rotating body. A sine wave is generated by such a transducer and its amplitude is proportional to the amount of eccentricity or runout of the rotating member. Such amplitude is related to the location of runout on the circumference of the rotatable member and is used in the trial and error determination of the circumferential position of the precise zone of imbalance.

Even with the use of such sophisticated equipment, however, inaccuracies still occur. By necessity, the member under test must be rotated at a speed which sufficiently corresponds to its ultimate operational speed to enable the determination of the extent of runout occurring in actual use. Such rotational speeds may be on the order of 1200 rpm corresponding, for example, to conventional automotive driveshaft speeds. Under such testing procedures it is impossible to obtain a dead stop condition at the precise point of maximum runout or imbalance. Consequently, a phase lag, caused by momentum of the rotating member and inertia of the moving parts of the testing equipment, results in the generation of sensor readings which are not circumferentially accurate. Accordingly, the precise zone of imbalance is a matter of guesswork and the correction of runout can only be obtained by trial and error. The vagaries of trial and error are compounded by such things as size and weight variations, manufacturing tolerances, and variations in welds, wall thicknesses, machining operations, and assembly, as well as other variations arising from the presence of mechanical couplings such as universal joints.

SUMMARY OF THE INVENTION

The present invention comprises a method and apparatus for balancing rotatable members and eliminates or greatly mimimizes the various problems referred to above. Simply stated, the invention involves dynamic balancing of a rotatable member by rotating such member about an axis at a selected speed first in one direction and determining as accurately as possible the apparent circumferential zone of maximum runout, then rotating the member about the same axis and at the same speed in the opposite direction and again determining as accurately as possible the apparent zone of maximum runout. Thereafter the member is rotated to and stopped at a circumferential mid point which is equidistant between the two previously determined apparent maximum runout zones, thus establishing the precise point of imbalance of such member.

Numerous advantages are attributable to the invention. Lag time is automatically compensated for by the bi-directional rotation about the same axis and at the same speed. All of the common manufacturing variations are accommodated as each individual member being tested is subJected to independent balancing without having to rely on average experience. Specifically, the extent to which any manufacturing variations contribute to total imbalance is automatically accounted for by the balancing technique of the invention. Furthermore, the invention is especially adapted for effectively balancing used and even substantially worn rotatable members, such as driveshafts, because wear of universal joints or the like automatically is accounted for in the correction of total imbalance. Thus, the problem of locating the exact point of imbalance regardless of mass, weight, diameter, and wear of the member being balanced, as well as any wear of the parts of the balancing apparatus, is wholly overcome.

DETAILED DESCRIPTION

The method and apparatus of the invention will be described in connection with the balancing of an automotive driveshaft, but it should be understood that the method and apparatus are capable of utilization in the balancing of other rotary members.

A preferred embodiment of balancing apparatus is illustrated as including an elongate body g having two support sections 10 and 11 respectively. Each section includes a rectangular base frame 12 provided with projecting feet 13 in the form of suitable apertured flanges which may be used to fix each section 10 and 11 to a supporting surface. Because of the box-like configuration of each support section 10 and 11, suitable storage is available for various parts and tools.

The top surface of each support section 10 and 11 is formed by flat members 14 which support the driveshaft balancing apparatus. Such surfaces may include spaced rail supports 15 which support a pair of rod-like rails 16 extending longitudinally of the body, the rails of each section 10 and 11 being aligned in close or abutting relation at the center of the apparatus so as to be continuous therealong.

Figure 1A:
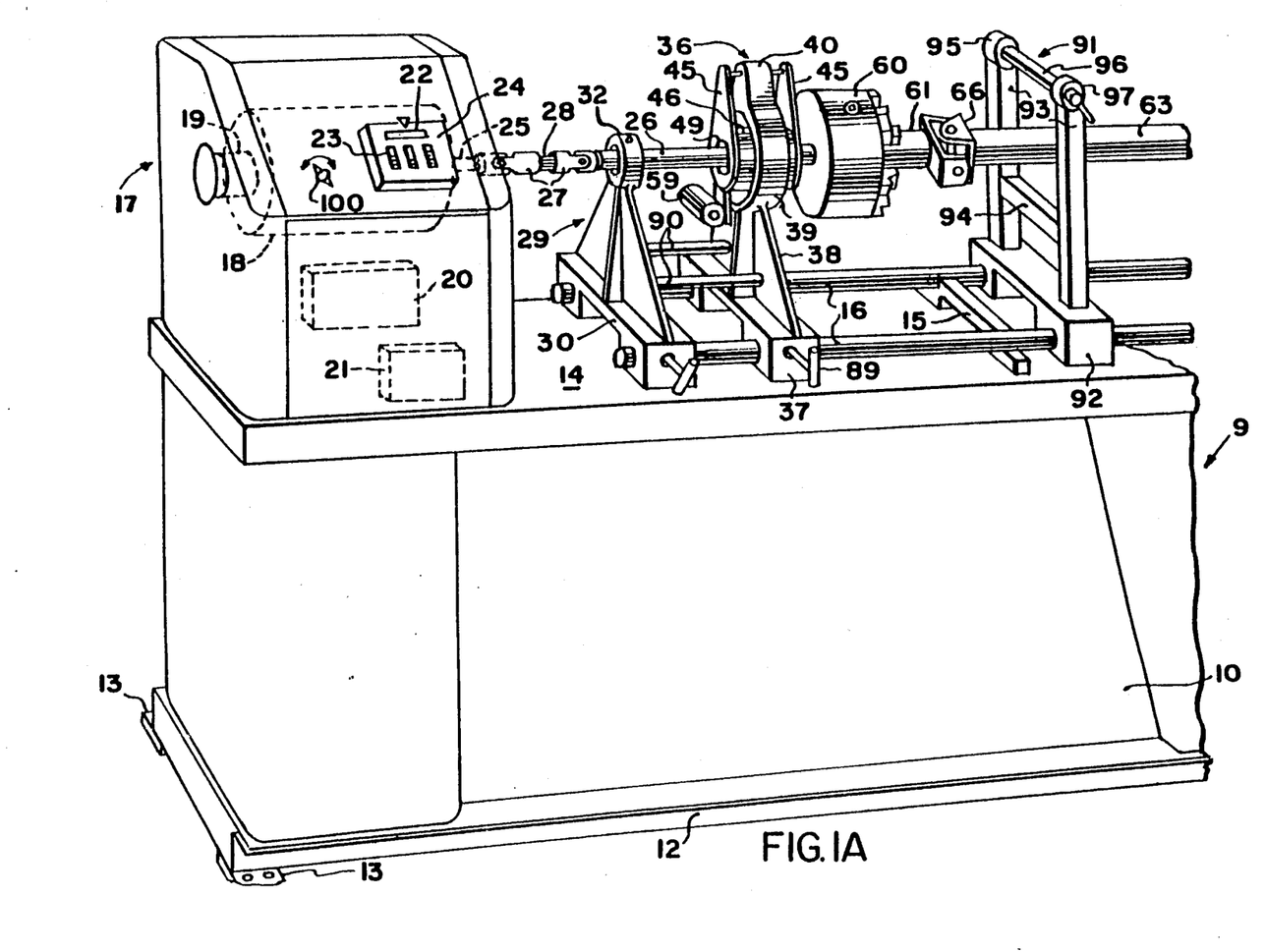
FIG. 1A is an isometric view of one end of a balancing machine according to a presently preferred embodiment of the invention.

At the left end of the apparatus as viewed in FIG. 1A there is a control housing 17 which includes a reversible electric motor 18, a shaft position encoder 19, a motor control circuit board 20, a power supply 21, an imbalance position bar graph display 22, an imbalance amount bar graph display 23, and a circuit board 24 which functions as a signal processor to correlate and indicate the position and amount of imbalance in a manner to be described.

Figure 2:
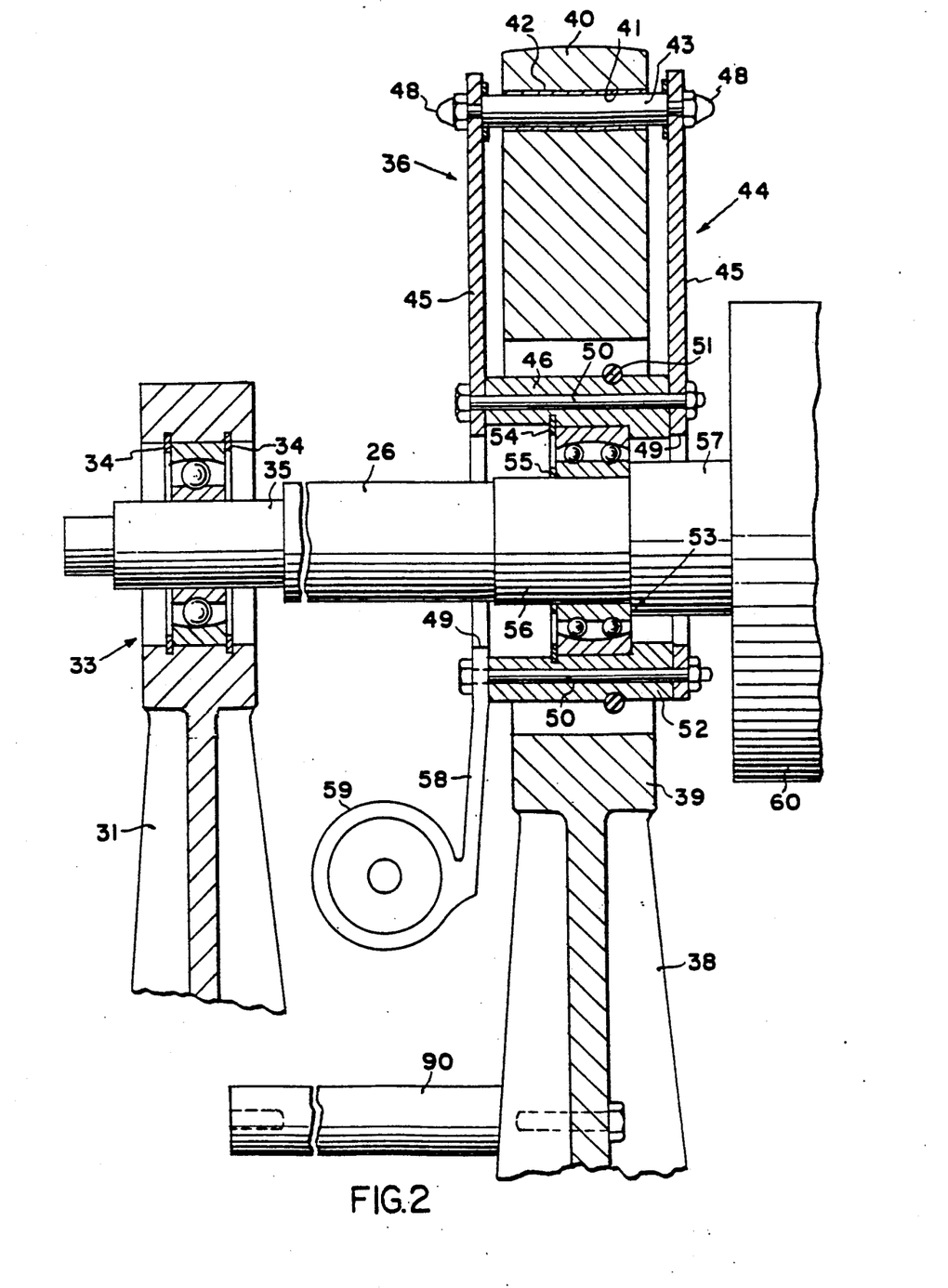
FIG. 2 is an enlarged vertical section of a portion of the apparatus shown in FIG. 1A.

Projecting from the control housing 17 is a drive shaft 25 suitably connected at one end thereof to the motor 18 and at the other end to a main drive shaft 26 through a pair of universal joints 27 which are joined by a spline 28. The main drive shaft 26 initially extends through a tower 29 which includes a base 30 spanning and accommodating the rails 16. Extending upwardly from the base is a body portion 31 which supports an annular bearing housing 32 containing therein a known form of self-aligning bearing 33 (FIG. 2) which is retained in the housing 32 by split rings 34. As also is shown in FIG. 2 the main shaft 26 is provided with a necked-down portion 35 which extends through the bearing 33 and has a slip fit in such bearing relative to the inner race thereof.

Closely adjacent the tower 29 is a swing tower 36 which also includes a base 37 spanning and accommodating the rails 16, and an upwardly extending body portion 38 terminating in a collar 39 provided with an upwardly projecting stub portion 40. Such stub portion 40 is provided with an aperture 41 (FIG. 2) having a bronze bushing 42 fixed therein and accommodating a swing shaft 43. A swingable bearing carrier 44 having a pair of swing arms 45 and a bearing housing 46 is pivotally mounted on the swing shaft 43, such shaft extending through aligned apertures in the swing arms 45. The arms 45 are retained on the shaft 43 by opposing retainer rings 47 and nuts 48.

The bearing housing 46 is of annular configuration and is mounted adjacent relatively large apertures 49 formed in the swing arms 45. The bearing housing 46 is retained in alignment with the apertures 49 by a plurality of bolts 50.

Encircling the outer surface of the bearing housing 46 is an O-ring 51 seated in a suitable groove formed in such outer surface. Such 0 ring functions to cushion any contact between the bearing housing 46 and the surrounding collar 39 in the event of unexpected, excessive swinging of the housing 46. The inner surface of the bearing housing 46 is provided with a stepped portion 52 abutting the outer race of a known form of self-aligning bearing 53 which is locked in place by an outer retaining ring 54 suitably fixed in a groove in the inner surface of the bearing housing 46. An inner retaining ring 55 is suitably locked on the main shaft 26 in confining engagement with the inner race of the bearing 53. The main shaft 26 includes an enlarged, stepped portion 56 which extends through the bearing 53. The shaft 26 includes still another enlarged, stepped portion 57 which engages the remaining surface of the inner race of the bearing 53 to lock the latter against the retaining ring 55.

As will be described in greater detail, the swing arms 45, including the bearing housing 46 and the bearing 53, may pivot relative to the tower 36 about the swing shaft 43 in response to oscillations of the main shaft 26 due to runout of a rotatable member being balanced. In order to measure the extent of runout, one of the swing arms 45 is provided with a flange portion 58 which extends downwardly and supports a known form of acceleration sensor 59. A suitable form of such sensor is a transducer available from Metrix Instrument Co., Houston, Tex., Model No. 526601. Such a transducer also is known as an accelerometer and includes a magnetic core slideable in a coil to generate a signal in the form of a sine wave. Such transducers sometimes are used on conventional forms of trial and error type balancers.

The main shaft 26 is drivingly connected to a known form of self-centering chuck 60. In the balancing of a driveshaft formed from tubular stock, a six-jaw chuck is preferably used. Such a chuck is pre-balanced before being mounted on the main shaft section 57. A suitable chuck may be obtained from Buck Chuck Company, Kalamazoo, Mich. The chuck 60 engages the splined free end 61 of a two-piece drive shaft 62 that is to be balanced and includes sections 63 and 64, an opposite end piece or spline 65 and a plurality of interconnecting universal joints 66. The chuck 60 also frequently is used in conventional forms of trial and error type balancers.

Figure 1B:
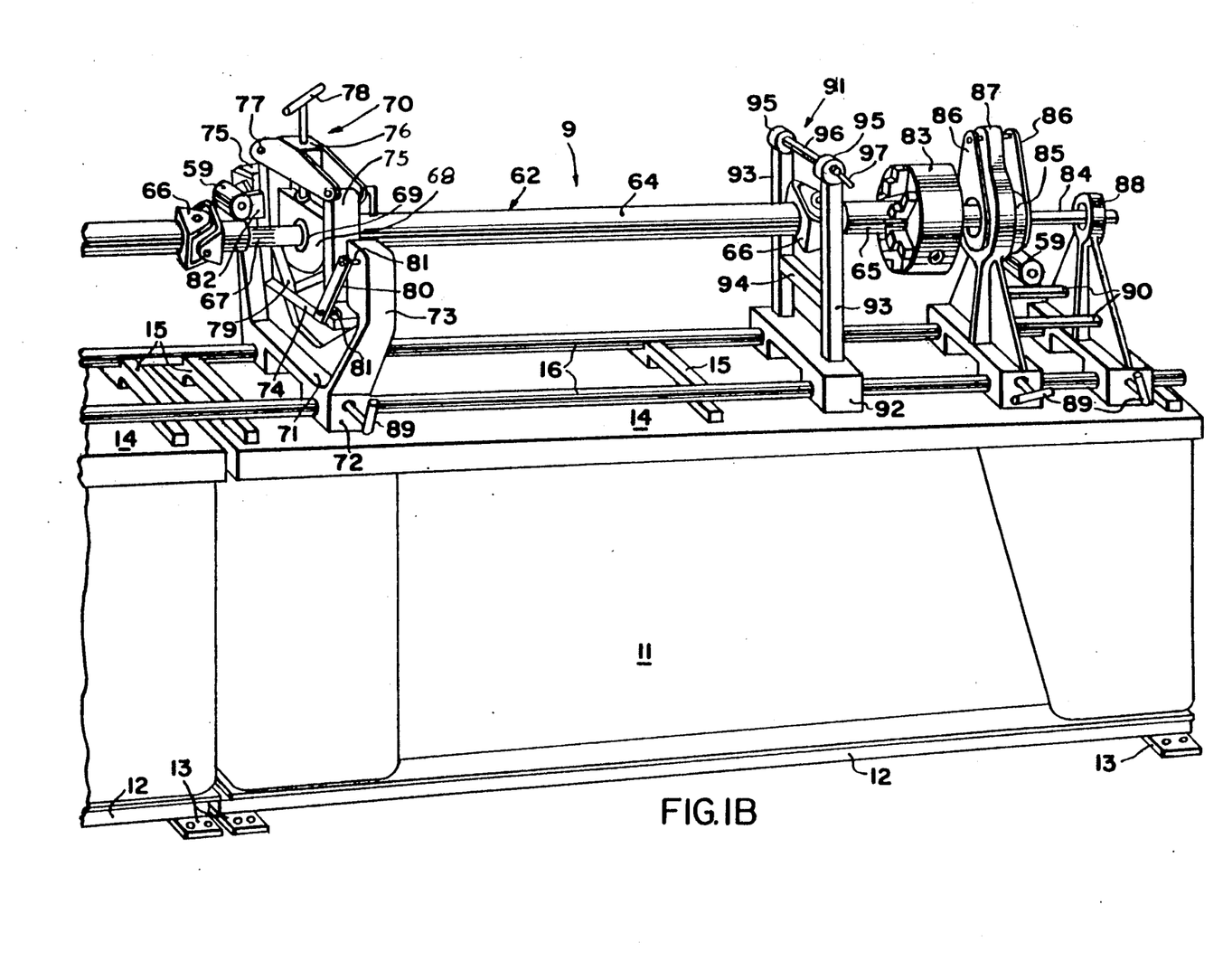
FIG. 1B is an isometric view of the remainder of the machine.

In the form of driveshaft 62 illustrated in FIGS. 1A and 1B, the sections 63 and 64 are interconnected by a spline 67 adjacent the center universal joint 66. Typically, a driveshaft support 68 in the form of a rubber or rubber-like hanger receives a portion of the shaft section 64 through a center mounted bearing 69. In order that the driveshaft 62 may be accurately balanced, it is necessary to check all of its operative parts and balance them where necessary. Thus, the centrally located hanger 68 preferably should be subjected to simultaneous testing for imbalance, and the disclosed apparatus accomplishes this objective.

To mount the hanger 68 for testing, a centrally located tower 70 is provided. This tower includes an upwardly opening U-shaped body portion 71 which includes a base portion 72 straddling and accommodating the rails 16. The body portion 71 includes upstanding arms 73 which receive therebetween a center hanger cage assembly. This assembly includes a bottom frame member 74 connected to upstanding side frame members 75 which in turn are connected to a top frame member 76 by removable pins 77. The top frame member 76 includes a threaded clamp 78 that is adjustable vertically and provided with a handle at the upper end thereof and a hanger engaging portion at the lower end. The clamp 78 is movable toward a pair of bottom plates 79 mounted in the cage to form a V-shaped base against which the hanger 68 is clamped.

The cage assembly is pivotal relative to the supporting body portion 71 thereof by means of pivot arms 80 connected to pivot pins 81 extending through the upwardly projecting arms 73 of the body portion 71 and the ends of the bottom frame member 74 of the cage assembly. Although not shown in FIG. 1B, the pivot arms 80 are paired on both sides of the cage assembly so that the entire assembly can pivot relative to the body portion 71 in response to oscillation caused by imbalance at or near the area of the hanger 68 and the adjacent universal joint 66. For purposes of indicating and recording any runout in this area, another sensor 59 is mounted by a supporting flange 82 to a side frame member 75 of the pivotal cage assembly.

The opposite end of the driveshaft 62 is supported in substantially the same manner as described with respect to the first end of the driveshaft, including the towers 29 and 36 as well as the self-centering chuck 60. Briefly, the remaining end piece 65 of the driveshaft 62 is mounted in another self-centering chuck 83 which in turn is mounted on an idler shaft 84 extending through the self-aligning bearing of a swinging bearing housing 85 supported by swing arms 86 which are pivotally mounted on a support member 87. One of the swing arms 86 includes a flange mounted sensor 59 of the type previously described.

The remaining end portion of the idler shaft 84 is mounted in a self-aligning bearing of the same type as the bearing 33 previously described, such bearing being mounted in a tower 88 of the same construction as the tower 29 previously described In this manner the idler shaft 84 may oscillate with the chuck 83 and the bearing housing 85 in response to imbalance at or near the outermost universal joint 66 of the driveshaft 62 and such oscillations will be detected by the sensor 59.

During use of the apparatus thus far described, each of the shafts 26 and 84 will oscillate in response to any driveshaft runout in the vicinity of such shafts. Such oscillation is permitted by reason of the pivoting towers 36 and 87. This operational characteristic is further enabled by the fixed towers 29 and 88. The self-aligning bearings in the fixed towers 29 and 88 define a fixed point about which the shafts 26 and 84 rotate and permit the shafts to rock but not oscillate in the manner of a pendulum. Because of the swinging of the bearing housings 46 and 85 and the use of self-aligning bearings therein, the shafts can move in response to runout while the fixed towers 29 and 88 maintain the integrity of the apparatus.

The positions of the various towers along the rails 16 are adjustable in order to accommodate driveshafts of varying length. Such positions are fixed by tower locks 89 of T configuration which are threadedly accommodated in end sections of the various support members for clamping engagement with one or both of the rails 16. Preferably, spacer bars 90 are entered between the upstanding body portions of adjacent towers 29 and 36 as well as 87 and 88 to maintain the preferred spacing of such towers for accurate operational results.

Safety cages 91 also may be provided at any desired location. As illustrated in FIGS. 1A and 1B, a pair of safety cages is provided, one of which embraces each section of the driveshaft 62. Each safety cage 91 includes a base member 92 spanning and slideably accommodating the rails 16. There is no need for locking members 89 as the safety cages 91 may be moved to any desired location at any time.

Each base member 92 includes upstanding arms 93 reinforced by a cross-member 94 located just above the base member 92. The top surfaces of the arms 93 are provided with annular portions 95 which receive a rod 96 having a locking member 97 at each end thereof. The locking members 97 are removable to release the rod 96 and enable insertion or removal of the driveshaft 62. The safety cages 91 are provided for the purpose of preventing the hurtling of driveshaft parts or sections which might break off or become disconnected during rotation thereof for balancing purposes.

To condition the apparatus for operation, the top rods 96 of the safety cages 91 are removed. The top cross member 76 of the tower 70 is either removed or pivoted upwardly and outwardly around one of the pins 77 to permit access to the interior of the tower. The self-centering chucks 60 and 83 are operated to expand the jaws thereof in the conventional manner to receive the ends 61 and 65 of the driveshaft 62 to be balanced Such ends 61 and 65 are usually in the form of splines.

The various driveshaft support sub-assemblies are adjusted along the rails 16 to accommodate the length of the driveshaft 62, and the tower 70 is moved into alignment with the hanger 68, the position of such hanger relative to the driveshaft corresponding to its normal position of use. Once the driveshaft 62 is connected between the chucks 60 and 83, the top cross member 76 of the tower 70 is returned to its operative position as shown in FIG. 1B, and the clamp 78 is actuated to fix the hanger 68 within the swinging cage portion. The safety rods 96 are returned to their operative position and the driveshaft is ready for balancing.

Figure 3:
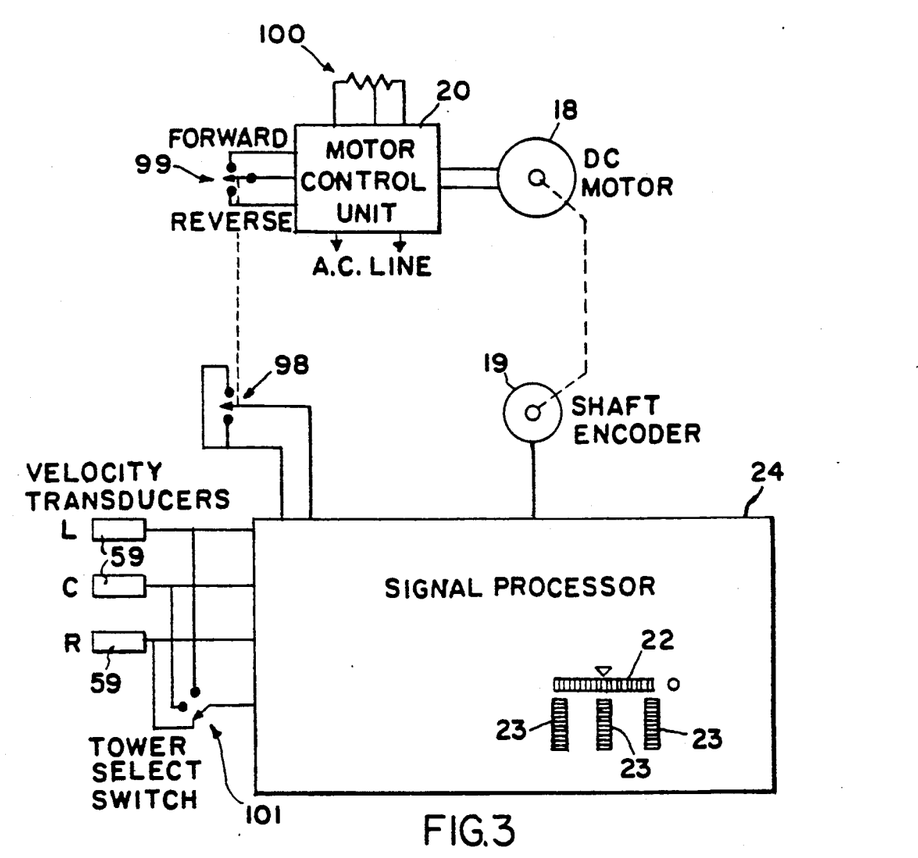
FIG. 3 is a block diagram of the essential components of the control and sensing mechanism.

The motor 18 is controlled by a switch 98 (FIG. 3) which functions through a "forward" or "reverse" switch 99 in conjunction with a speed control 100 to commence rotation of the driveshaft 62 in one direction, say clockwise, at a selected speed. As the driveshaft 62 rotates in the first or clockwise direction, the point or points of imbalance are sensed or detected by the velocity transducers 59, the positions of such transducers being identified by "L" for the one on the left as viewed in FIG. 1A, "C" for the one located in the center as shown in FIG. 1B and "R" for the one at the right as viewed in FIG. 1B. The outputs, in the form of sine waves, from such transducers are processed as runout inputs in the signal processor 24 of the apparatus. Vertically aligned runout bar graphs 23 forming a part of the signal processor 24 provide a visual indication of the extent of runout at each of the three different locations, L, C, and R. Simultaneously, the optical shaft encoder 19, which is responsive to motor operation, provides input in known manner to the signal processor 24 for each transducer reading as controlled by the selection switch 101.

By selecting the transducer readings in sequence via the selection switch 101, the signal processor 24 in conjunction with the shaft encoder 19 activates a circumferential position indicator 102 (FIG. 4) on the horizontal bar graph 22 which identifies the apparent zone of maximum imbalance of the gdriveshaft 62 as sensed by the selected transducer 59. This initial indication is provided solely with respect to the clockwise rotation of the driveshaft 62.

Figure 4:
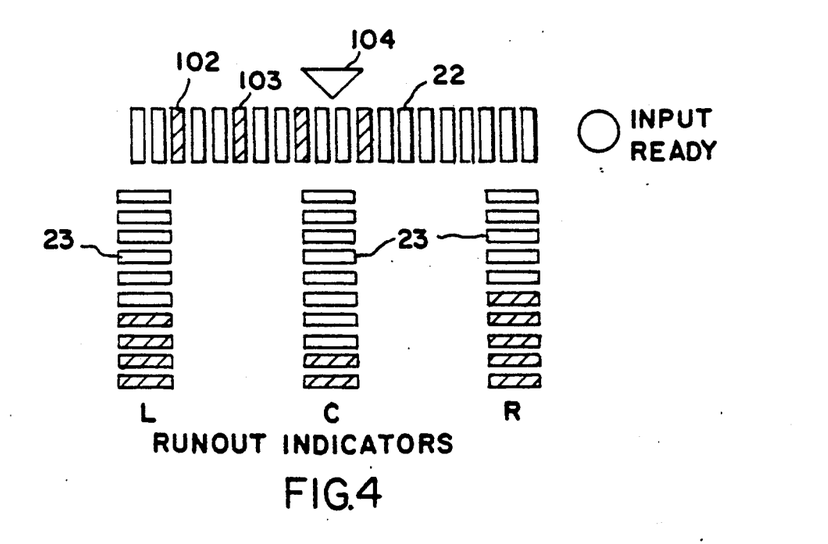
FIG. 4 is a diagrammatic illustration of a portion of the control panel.

The motor 18 is then stopped and its direction of rotation reversed by the switch 99 (FIG. 3) so as to rotate the driveshaft about the same axis in the opposite or counter clockwise direction and at the same speed selected earlier for the clockwise rotation. Again, the transducers 59 function to sense runout at each of the three different locations and provide such information to the signal processor 24 while simultaneously such processor is supplied with a signal from the shaft encoder 19 to locate a second apparent circumferential zone of maximum runout. This second zone of maximum runout is displayed on the horizontal bar graph 22 and, by way of example, is indicated in FIG. 4 as 103. The readings of the runout indicators 23 should be substantially the same regardless of the direction of rotation of the driveshaft 62. However, the signal processor 24 processes the encoder input so as to provide spaced indications of runout at each of the sensor locations because of the reversal of driveshaft rotation. Thus, for each sensor location, a pair of spaced display readings or indicators 102 and 103 will be provided, assuming that the shaft is out of balance. Each such display reading inherently includes the phase lag. Accordingly, each such reading represents the apparent point of maximum shaft imbalance, but not the actual point of such imbalance.

Following completion of the reverse rotation of the driveshaft 62 the motor 18 is stopped and the driveshaft permitted to come to rest. The operator then manually rotates the driveshaft 62 in one direction or the other to adjust the two spaced indicators 102 and 103 to a position uniformly bracketing a fixed pointer 104 located above the horizontal bar graph 22 display. The pointer is used to determine the exact point of imbalance which is equidistant between the two apparent points as shown by the indicators 102 and 103. Inasmuch as the shaft has been rotated to determine this point, the actual point of imbalance on the shaft at a selected transducer station is located at the top of such shaft at such station.

The runout indicator bar graphs 23 provide a reading of the amount of runout at each sensor station. Such amounts are relative and the signal processor 24 may be selectively programmed so that each display increment represents 0.001 inch of runout. Readings of this type may be calibrated to a given type of workpiece being subjected to balancing. For example, if the apparatus is used exclusively to balance the same type of rotary members, such as new driveshafts, experience gained from repeated operations will permit selective programming of the signal processor 24 so that each increment of runout at each sensor location will correspond to a given weight to be added or subtracted at such location.

Figure 5:
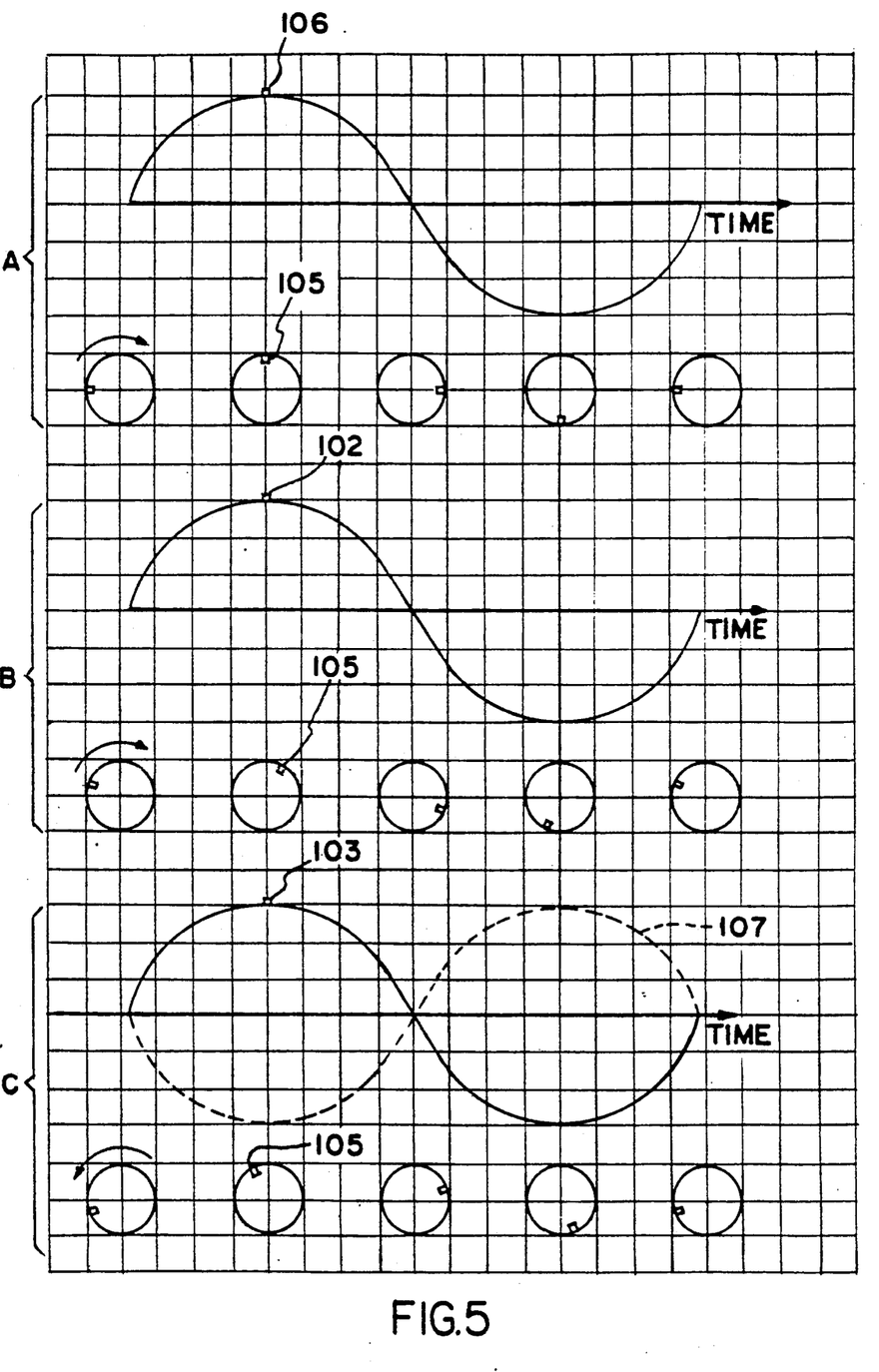
FIG. 5 is a diagram of the operational characteristics of the sensors utilized in the apparatus.

As referred to above, each velocity transducer generates a sine wave. The amplitude of such a sine wave is proportional to the amount of eccentricity (runout) at the point on the shaft where the imbalance occurs. The phase relationship of this sine wave to the angular position of the shaft, as indicated by the encoder 19, would correspond to the angular position of the imbalance on the shaft if it were not for the inherent lag or phase shift. Such relationship is illustrated in FIG. 5 wherein grouping A illustrates a hypothetical situation involving no inherent phase shift or lag. In such a situation when the point of imbalance 105 moves in a clockwise direction past the top or 0° point of the shaft, a peak 106 of greatest amplitude is reached in the sine wave output of a sensor. Under such an ideal condition the encoder would report the circumferential position of imbalance to the signal processor 24 and only a single display reading would appear on the bar graph 22 for both clockwise and counterclockwise driveshaft rotation. There thus would be no need for bi-directional driveshaft rotation. The driveshaft could be manually rotated so that the point of imbalance 105 is located at the top for convenient weight addition or removal. As a result of appropriate programming of the signal processor 24, the manual rotation of the driveshaft would move the single display reading to a position on the bar graph 22 directly opposite the pointer 104, at which stage of the operation the point of imbalance 105 would be at the 0° position of driveshaft circumference.

Grouping B illustrates a lag time between the sensor reading 102 and the shaft reference point 105 assuming clockwise rotation of an unbalanced shaft, such lag being due to momentum of the shaft adversely affecting the sensor reading as well as inertia of the moving parts of the apparatus. Stated otherwise, the mass of the various rotating parts, including those of the balancing machine and the member being balanced, creates a lag time which results in an apparent, but false, indication of the point of imbalance. The apparatus and method disclosed herein, however, compensate for this lag time by requiring rotational evaluation of a member in a bi-directional manner so that such member is rotated both clockwise and counterclockwise about the same axis and at the same speed and the points of apparent maximum runout readings indicated in each instance. The apparent points of maximum runout thus indicated are compared to one another and the mid-point between such apparent maximum points establishes the true point of imbalance.

The term "lag" as used herein may be defined as a delay in timing. That is, the cause of the imbalance (a variation in mass for example) moves past the circumferential point of recording the effect of the imbalance (the peak of runout) and a time lag between the cause and effect occurs. Momentum of the driveshaft, as well as inertia of the various movable parts of the apparatus, such as the swing towers 36 and 87 and the hanger tower 70, contribute to this lag. For example, the sliding magnetic core in the conventional form of velocity transducer 59 must change direction when reporting the peak reading 102. Such change of direction involves a mechanical lag which translates into an electronic lag which may be referred to as a phase shift. Thus, the driveshaft's angular runout position will have shifted past the peak runout amplitude reported to and recorded by the signal processor 24. The encoder 19 thus reports a circumferential position which is actually trailing that which caused the runout.

Grouping B of FIG. 5 illustrates the presence of a 15° lag at the point 102 on the sine wave. Grouping C of FIG. 5 illustrates in broken lines the sine wave 107 developed by a transducer when the direction of rotation is reversed. This sine wave may be inverted or shifted 180° as shown in solid lines with the erroneous sensor reading of the point of imbalance 103 being positioned behind the actual point 105 of imbalance but in the opposite direction Grouping C also represents a lag of 15°, but in the opposite direction. Therefore, when the two points 102 and 103 are processed, the horizontal bar graph 22 shows these points in lineal spaced relation. In this manner the mid point between these lag points quickly may be determined by manual rotation of the member undergoing balancing, such mid-point being the actual and precise point of imbalance. Thereafter, weight may be added or removed depending upon the type of workpiece undergoing balancing to correct the imbalance.

By recording the phase relationship of the velocity transducer's signal to the angular position of the shaft in each direction, an unambiguous reading can be obtained. The type of shaft position encoder 19 used is well known and has been used in workpiece balancers in the past to illuminate a digit or generate a display light in attempting to identify the circumferential point of imbalance.

A suitable commercial encoder can be obtained from Vernitech, Deer Park, N.Y., Model VOE. Such an encoder may be divided into 36 segments thus providing a sensor signal for every 10 degrees of shaft rotation. The motor 18 drives the encoder 19 in phase with rotation of the shaft. The signal processor 24 receives both the sensor and the encoder input and has appropriate circuitry to utilize such input in a known manner, except that such processor is programed for bi-directional rotational analysis as described herein.

Additional indicators (not shown) may be utilized in connection with the signal processor 24 and the system in which it forms an important part. For example, a clearing switch may be provided to remove from the memory portions of the system the sensor readings of a member previously balanced. Additionally, phase shifting means may be provided to assure that the point for adding or removing weight always will be conveniently accessible. Further, a suitable indicator may be used to inform the machine operator whether weight should be added or removed. Thus, although a specific form of electronic evaluation system has been referred to, it will be understood that other types of evaluation systems may be utilized.

Preferably, the motor 18 is a DC motor so that variable speeds and reversibility can be obtained at minimum cost. Driveshafts may be balanced in sections but it is preferred to balance the complete shaft in its fully assembled and usable form. Thus, the apparatus is especially adapted for driveshaft balancing as it can accommodate the hanger portion of the driveshaft and balance the shaft in a most effective manner.

While the apparatus may be provided with a fixed speed of operation, particularly where it is to be used exclusively to balance the same type of workpiece, an acceptable variable speed range is 0 to 2500 rpm. Most balancing of automotive driveshafts will occur at about 1200 rpm.

The method and apparatus of the invention are unique in that variations in manufacturing, tolerances and clearances, such as in bearings as well as that due to normal wear, are all automatically compensated for by reason of the canceling out of the lag factor. Tolerances, clearances, and wear add to the amount of lag present, but because the apparatus according to the invention automatically cancels out any lag factor, the usefulness of the invention is substantially increased. Even vibrations due to any of the foregoing variations, or differences in the size and shape of workpieces, will not adversely affect effective use of the apparatus. There is no mechanical or electronic calibration present subject to deterioration.

Virtually any type of of rotatable member be subjected to the unique balancing technique of the invention. Examples of such members include armatures, flywheels, turbines, crankshafts, and driveshafts.

What is claimed is:

1. Apparatus for balancing an unbalanced rotatable member comprising:
   (a) support means for supporting said member for rotation about an axis;
   (b) drive means for rotating said member about said axis, said drive means bein bi-directional for rotating said member selectively in first and second opposite directions; Kenneth A. Sandstrom
   (c) speed control means coupled to said drive means for establishing a selected and equal rotational speed of said member in each of said first and second pposite directions;
   (d) sensing means operatively associated with said member for generating a signal in response to the maximum extent of imbalance in each of said first and second opposite directions;
   (e) encoder means operatively associated with said member for generating a series of signals to identify circumferential positions on said member in each of said first and second opposite directions;
   (f) signal processing means operable in cooperation with said sensor and said encoder means to combine said signals and establish first and second circumferentially spaced points of apparent maximum imbalance relative to said member in response to rotation thereof in said first and second opposite directions; and
   (g) means for identifying the mid-point between said first and second points of apparent maximum imbalance upon further rotation of said member, said identifying means including display means remote from said member for displaying the spacing between said first and second points in linear relationship relative to a mid-point indicator forming a part of said display means.

2. The apparatus of claim 1 which further includes additional display means remote from said member and responsive to signals from said sensor means to depict the magnitude of said maximum extent of imbalance, and incremental means forming a part of said additional display means to permit calibration in determination of the amount of weight to be added to or removed from said member to balance said member.

3. Apparatus for balancing an unbalanced rotatable member comprising:
   (a) support means for supporting said member for rotation about an axis of said member;
   (b) drive means for rotating said member about said axis, said drive means being reversible and operative to rotate said member in first and second opposite directions;
   (c) tower means forming a part of said support means and including cage means for accommodating said member, said cage means being pivotally connected to said tower means to permit unimpeded swinging of said cage means in opposite directions relative to said tower means in response to oscillations of said member during rotation of said member in said first and second opposite directions;
   (d) a top frame member forming a part of said cage means and enclosing its top, said top frame member including quick release attachment means at opposite ends thereof for inserting and removing said member into and from said cage means;
   (e) adjustable clamping means forming a part of said top frame member and projecting centrally therethrough for engaging and holding said member in said cage means during rotation of said member; and (f) sensor means carried by said cage means for swinging therewith for sensing and indicating the extent of said oscillations.

4. The apparatus of claim 3 including speed control means coupled to said drive means for establishing a selected and equal rotational speed of said member in each of said first and second opposite directions; said sensor means being operable to generate a signal in response to the maximum extent of imbalance in each of said first and second opposite directions; encoder means operatively associated with said member for generating a series of signals to identify circumferential positions on said member in each of said first and second opposite directions; signal processing means operable in cooperation with said sensor and said encoder means for combining said signals and establishing first and second circumferentially spaced points of apparent maximum imbalance relative to said member in said first and second opposite directions; and means for identifying the mid-point between said first and second points of apparent maximum imbalance upon further rotation of said member at any speed and in either direction, said mid-point establishing a third point relative to the circumference of said member and constituting the actual point of maximum imbalance.

5. The apparatus of claim 4 including display means remote from said member whereby said first and second points are displayed in linear relationship relative to a mid-point indicator forming a part of said display means.

6. The apparatus of claims 5 including additional display means remote from said member and responsive to signals from said sensor means to depict the magnitude of said maximum extent of imbalance, and incremental means forming a part of said additional display means to permit calibration in the determination of the amount of weight ot be added to or removed from said member.

7. Apparatus for balancing an unbalanced rotatable member comprising:

(a) drive shaft means to which said member may be coupled for rotation of said member about an axis thereof;

(b) support means for said drive shaft means to permit rotational driving thereof;

(c) coupling means carried by said drive shaft means for engagement with said member to rotate said member about said axis;

(d) reversible drive means driving said drive shaft means, said drive means being operable to rotate said member in first and second opposite directions;

(e) first and second tower means forming a part of said support means, said first tower means being located outwardly of said second tower means and including self-aligning bearing means through which said drive shaft means extends, said second tower means including an upstanding collar means establishing an annular opening therethrough, bearing carrier means formed from spaced swing arms received in said opening, said swing arms extending upwardly over opposite end faces of said collar means, pivot means attaching said swing arms to said collar means to permit unimpeded swinging of said bearing carrier means in said opening, and further self-aligning bearing means in said bearing carrier means and receiving said drive shaft means therethrough, said carrier means being swingable in opposite directions in response to oscillation of said drive shaft means caused by imbalance of said member; and (f) sensor means mounted on one of said swing arms to swing with said carrier means for sensing and indicating the extent of said oscillations.

8. The apparatus of claim 7 which further includes speed control means coupled with said drive means for maintaining a selected and equal rotational speed of said member in each of said first and second opposite directions; said sensor means generating a signal in response to the maximum extent of imbalance in each fo said first and second opposite directions; encoder means associated with said member for generating a series of signals to identify circumferential positions on said member ineach of said first and second opposite directions; signal processing means operable in cooperation with asid sensor and said encoder means to combine said signals and establish first and second circumferentially spaced points of apparent maximum imbalance relative to said member in said first and second opposite directions; and means for identifying the mid-point between said first and second points of apparent maximum imbalance upon further rotation of said member at any speed and in either direction of rotation, said mid-point establisying a third point relative to the circumference of said member and constituting the actual point of maximum imbalance.

9. The apparatus of claim 8 including display means remote from said member for displaying said first and second points in linear relationship relative to a mid-point indicator forming a part of said display means.

10. The apparatus of claim 9 including additional display means remote from said member and responsive to signals form said sensor means to depict the magnitude of said maximum extent of imbalance, and incremental means forming a part of said additional display means to permit calibration in determining the amount of weight to be added to or removed from said member to balance said member.

11. The apparatus of claim 7 including an idler shaft means spaced from said drive shaft means to receive said member therebetween, said idler shaft means being provided with member coupling means to engage said member and rotate therewith; further tower means identical to said first and second tower means but arranged in reverse sequence and supporting said idler shaft means to permit rotation and swinging thereof in response to oscilaltion caused by imbalance of said member; and further sensor means mounted on one of said swinging arms of one of said further tower means.

12. The apparatus of claim 11 including third tower means forming a part of said support means and including cage means to receive a part of said member between opposite ends thereof, said cage means being pivotally connected to said third tower means to permit unimpeded swinging of said cage means in opposite directions relative to said third twoer means in response to oscillation of said member during rotation of said member in said first and second opposite directions; a top frame member forming a part of said cage means and enclosing its top, said top frame member includign quick release attachment means at opposite ends thereof for inserting and removing said member into and from said cage means; and adjustable clamping means forming a part of said top frame member and projecting centrally therefrom to engage and hold said member for rotation thereof in said cage means.

* * * * *

UNITED STATES PATENT AND TRADEMARK OFFICE
CERTIFICATE OF CORRECTION

PATENT NO. : 5,046,361

DATED : September 10, 1991

INVENTOR(S) : Kenneth A. Sandstrom

It is certified that error appears in the above-identified patent and that said Letters Patent is hereby corrected as shown below:

Column 1, line 24, change "totation" to -- rotation --.

Column 2, line 42, change "subJected" to -- subjected --.

Column 3, line 11, change "g" to -- 9 --.

Column 4, line 3, change "O ring" to -- O-ring --.

Column 5, line 37, after "described" insert a period.

Column 6, line 24, after "balanced" insert a period; line 65, change "gdriveshaft" to -- driveshaft --.

Column 7, line 4, change "counter clockwise" to -- counterclockwise --.

Column 8, line 61, after "direction" insert a period.

Column 9, line 64, cancel "of" (second occurrence); after "member" insert -- may --.

Column 10, line 6, change "bein" to -- being --; line 8, cancel "Kenneth A. Sandstrom"; line 12, change "pposite" to -- opposite --; line 13, change "sensing" to -- sensor --.

Column 11, line 38, change "ot" to -- to --.

Column 12, line 12, change "fo" to -- of --; line 16, change

UNITED STATES PATENT AND TRADEMARK OFFICE
CERTIFICATE OF CORRECTION

PATENT NO. : 5,046,361

DATED : September 10, 1991

INVENTOR(S) : Kenneth A. Sandstrom

It is certified that error appears in the above-identified patent and that said Letters Patent is hereby corrected as shown below:

"ineach" to -- in each --; line 17, change "asid" to -- said --;

line 25, change "establisying" to --establish- --; line 34, change "form" to -- from --; line 57, change "twoer" to -- tower --; line 61, change "includign" to -- including --.

Signed and Sealed this

First Day of December, 1992

*Attest:*

DOUGLAS B. COMER

*Attesting Officer*  *Acting Commissioner of Patents and Trademarks*